(12) United States Patent
Oga et al.

(10) Patent No.: US 7,246,657 B2
(45) Date of Patent: Jul. 24, 2007

(54) AIR CONDITIONER FOR VEHICLE

(75) Inventors: Akira Oga, Ichinomiya (JP);
Katsuhiko Samukawa, Okazaki (JP)

(73) Assignee: DENSO Corporation, Kariya (JP)

( * ) Notice: Subject to any disclaimer, the term of this patent is extended or adjusted under 35 U.S.C. 154(b) by 613 days.

(21) Appl. No.: 10/889,652

(22) Filed: Jul. 12, 2004

(65) Prior Publication Data

US 2005/0039902 A1 Feb. 24, 2005

(30) Foreign Application Priority Data

Jul. 15, 2003 (JP) .............................. 2003-274746

(51) Int. Cl.
*B60H 1/00* (2006.01)
*G05D 23/00* (2006.01)

(52) U.S. Cl. ...................... 165/203; 165/288; 700/299; 700/300

(58) Field of Classification Search ................ 165/202, 165/203, 204, 253, 287, 288; 700/299, 300
See application file for complete search history.

(56) References Cited

U.S. PATENT DOCUMENTS

| 4,537,245 | A | 8/1985 | Nishimura et al. | |
|---|---|---|---|---|
| 4,856,710 | A | 8/1989 | Takada et al. | |
| 6,892,808 | B2 * | 5/2005 | Remond et al. | 165/203 |
| 6,912,861 | B2 * | 7/2005 | Imoto | 165/203 |
| 6,945,060 | B2 * | 9/2005 | Tomita et al. | 165/203 |

2004/0103675 A1 6/2004 Tomita

FOREIGN PATENT DOCUMENTS

| FR | 2 717 747 | 9/1995 |
|---|---|---|
| JP | 08-058347 | 3/1996 |
| JP | 2004-106714 | 4/2004 |

OTHER PUBLICATIONS

Examination Report dated Jul. 26, 2006 from co-pending GB application No. GB0415465.4.
Search Report dated Nov. 17, 2004 in Gt. Britain Application No. GB 0415465.4.

\* cited by examiner

*Primary Examiner*—Ljiljana Ciric
(74) *Attorney, Agent, or Firm*—Harness, Dickey & Pierce, PLC

(57) ABSTRACT

In an air conditioner for a vehicle having first and second air conditioning zones positioned at right and left sides of a front seat in a vehicle compartment and third and fourth air conditioning zones positioned at right and left sides of a rear seat in the vehicle compartment, the air conditioner includes calculating means for calculating each of target blowing-out temperatures of air blown out to the first to fourth air conditioning zones in accordance with environmental conditions and desirable temperatures of the first to fourth air conditioning zones. In the air conditioner, the calculating means corrects an influence from the other air conditioning zones by using a selected desirable temperature in the desirable temperatures of the first to fourth air conditioning zones, while calculating the individual target blowing-out temperatures of the first to fourth air conditioning zones.

9 Claims, 5 Drawing Sheets

AIR CONDITIONER FOR VEHICLE

CROSS REFERENCE TO RELATED APPLICATION

This application is based on Japanese Patent Application No. 2003-274746 filed on Jul. 15, 2003, the disclosure of which is incorporated herein by reference.

FIELD OF THE INVENTION

The present invention relates to an air conditioner for a vehicle for automatically controlling an interior of a vehicle compartment to a comfortable temperature.

BACKGROUND OF THE INVENTION

In a conventional air conditioner for a vehicle, desirable temperatures are independently set with respect to a right-hand side air conditioning zone and a left-hand side air conditioning zone located rightward and leftward in a front seat within the vehicle compartment. Each of environmental conditions (e.g., inside air temperature, solar radiating amount) of the right-hand side air conditioning zone and the left-hand side air conditioning zone is independently detected. Further, a target blowing-out temperature of air blown out is calculated every air conditioning zone by using this detected environmental condition and the desirable temperature, and the blown-out air temperature is independently controlled every air conditioning zone so as to approach the target blowing-out temperature (e.g., JP Patent No. 3322012).

In this structure, when the target blowing-out temperature of the right-hand side air conditioning zone is calculated, a temperature difference between the desirable temperature of the right-hand side air conditioning zone and the desirable temperature of the left-hand side air conditioning zone is used. Therefore, the target blowing-out temperature of the right-hand side air conditioning zone can be appropriately calculated even when this device has an influence from the left-hand side air conditioning zone.

Further, when the target blowing-out temperature of the left-hand side air conditioning zone is calculated, the temperature difference between the desirable temperature of the right-hand side air conditioning zone and the desirable temperature of the left-hand side air conditioning zone is used. Therefore, the target blowing-out temperature of the left-hand side air conditioning zone can be appropriately calculated even when this device has an influence from the right-hand side air conditioning zone.

As described above, even when this device has an influence from one of the right-hand side air conditioning zone and the left-hand side air conditioning zone, the target blowing-out temperature of the other air conditioning zone can be appropriately calculated. Accordingly, the temperatures of the air blown out to both the air conditioning zones can be appropriately and independently controlled.

When the above vehicle air conditioner is used for a vehicle having four seats constructed by front, rear, left and right seats, this air conditioner has an influence from the front seat side in a calculating of the target blowing-out temperature of the rear seat right-hand side air conditioning zone. Therefore, a target blowing-out temperature of the rear seat right-hand side air conditioning zone cannot be appropriately calculated by merely using the temperature difference between the desirable temperature of the rear seat right-hand side air conditioning zone and the desirable temperature of the rear seat left-hand side air conditioning zone. Accordingly, a problem that the temperature of the air blown out to the rear seat right-hand side air conditioning zone cannot be appropriately controlled is caused.

Similarly, this air conditioner has an influence from the front seat side in a calculating of the target blowing-out temperature of the rear seat left-hand side air conditioning zone. Therefore, a target blowing-out temperature of the rear seat left-hand side air conditioning zone cannot be appropriately calculated by merely using the temperature difference between the desirable temperature of the rear seat right-hand side air conditioning zone and the desirable temperature of the rear seat left-hand side air conditioning zone. Accordingly, a problem that the temperature of the air blown out to the rear seat left-hand side air conditioning zone cannot be appropriately controlled is caused.

SUMMARY OF THE INVENTION

In view of the above-described problems, it is an object of the present invention to provide an air conditioner for a vehicle, which can respectively independently control an air temperature blown into each air conditioning zone to a comfortable temperature even when desirable temperatures of four air conditioning zones located forward, backward, leftward and rightward within a vehicle compartment are independently changed.

According to the present invention, in an air conditioner for a vehicle having first and second air conditioning zones positioned at right and left sides of a front seat in a vehicle compartment and third and fourth air conditioning zones positioned at right and left sides of a rear seat in the vehicle compartment, the air conditioner includes: environmental condition determining means for determining environmental conditions of the first to fourth air conditioning zones by respectively detecting the environmental conditions or by estimating the environmental conditions from at least one of detected values; setting means for setting each of desirable temperatures of the first to fourth air conditioning zones by a passenger in the vehicle compartment; calculating means for calculating each of target blowing-out temperatures of air blown out to the first to fourth air conditioning zones in accordance with the environmental conditions determined by the environmental condition determining means and the desirable temperatures of the first to fourth air conditioning zones; and control means for respectively independently controlling temperatures of air blown out to the first to fourth air conditioning zones, to the target blowing-out temperatures, respectively. In the air conditioner, the calculating means corrects an influence from the other air conditioning zones by using a selected desirable temperature in the desirable temperatures of the first to fourth air conditioning zones, while calculating the individual target blowing-out temperatures of the first to fourth air conditioning zones.

Because the blown-out air temperature is controlled every air conditioning zones by using the target blowing-out temperature calculated in this way, the air temperature every air conditioning zone can be respectively independently controlled to a comfortable temperature even when the desirable temperature is independently changed every air conditioning zone.

Preferably, the calculating means respectively calculates the target blowing-out temperatures of the first and second air conditioning zones by using a temperature difference between the desirable temperature of the first air conditioning zone and the desirable temperature of the second air conditioning zone. Further, the calculating means also respectively calculates the target blowing-out temperatures of the third and fourth air conditioning zones by using a temperature difference between the desirable temperature of the third air conditioning zone and the desirable temperature of the fourth air conditioning zone, and a temperature difference between the desirable temperature of one of the first and second air conditioning zones and the desirable temperature of one of the third and fourth air conditioning zones.

For example, the environmental condition determining means includes a detecting means for detecting an air temperature of at least a predetermined air conditioning zone in the first to fourth air conditioning zones, and an estimating means for estimating air temperatures of the other air conditioning zones, except for the predetermined air conditioning zone. In this case, the calculating means calculates the target blowing-out temperatures of the first to fourth air conditioning zones in accordance with desirable temperatures of the first to fourth air conditioning zones, the air temperatures estimated by the estimating means and the air temperature detected by the detecting means. Further, the estimating means calculates a temperature difference between each desirable temperature of the other air conditioning zones and the desirable temperature of the predetermined air conditioning zone, and estimates each air temperature of the other air conditioning zones based on the calculated temperature difference and the air temperature of the predetermined air conditioning zone detected by the detecting means.

Alternatively, the calculating means corrects an influence due to a temperature difference between the desirable temperatures of the first and second air conditioning zones, when calculating the target blowing-out temperatures of the first and second air conditioning zones. Further, the calculating means corrects an influence due to a temperature difference between the desirable temperatures of the third and fourth air conditioning zones and an influence due to a temperature difference between each desirable temperature of the third and fourth air conditioning zones and each desirable temperature of the first and second air conditioning zones, when calculating the target blowing-out temperatures of the third and fourth air conditioning zones.

Alternatively, the calculating means includes a first calculation portion for calculating the target blowing-out temperature of the first air conditioning zone, a second calculation portion for calculating the target blowing-out temperature of the second air conditioning zone, a third calculation portion for calculating the target blowing-out temperature of the third air conditioning zone, and a fourth calculation portion for calculating the target blowing-out temperature of the fourth air conditioning zone. In this case, the first calculation portion calculates the target blowing-out temperature of the first air conditioning zone by using at least the desirable temperature of the first air conditioning zone and a correction portion that is a difference between the desirable temperature of the second air conditioning zone and the desirable temperature of the first air conditioning zone. The second calculation portion calculates the target blowing-out temperature of the second air conditioning zone by using at least the desirable temperature of the second air conditioning zone and a correction portion that is a difference between the desirable temperature of the first air conditioning zone and the desirable temperature of the second air conditioning zone. The third calculation portion calculates the target blowing-out temperature of the third air conditioning zone by using the desirable temperature of the third air conditioning zone, a correction portion that is a difference between the desirable temperature of the first air conditioning zone and the desirable temperature of the third air conditioning zone, and a correction portion that is a difference between the desirable temperature of the second air conditioning zone and the desirable temperature of the third air conditioning zone. Further, the fourth calculation portion calculates the target blowing-out temperature of the fourth air conditioning zone by using the desirable temperature of the fourth air conditioning zone, a correction portion that is a difference between the desirable temperature of the first air conditioning zone and the desirable temperature of the fourth air conditioning zone, and a correction portion that is a difference between the desirable temperature of the second air conditioning zone and the desirable temperature of the fourth air conditioning zone.

Specifically, the environmental condition determining means includes first to fourth inside air temperature sensors for detecting inside air temperatures of the vehicle compartment, respectively, corresponding to the first to fourth air conditioning zones. In this case, the calculating means calculates the target blowing-out air temperature of each air conditioning zone by using inside air temperatures detected by the first to fourth inside air temperature sensors. Therefore, the target blowing-out temperature of air to be blown to each of the first to fourth air conditioning zones can be accurately calculated.

Alternatively, the environmental condition determining means includes a first inside air temperature sensor for detecting an inside air temperature of one of the first and second air conditioning zones, and a second inside air temperature sensor for detecting an inside air temperature of one of the third and fourth air conditioning zones. In this case, the environmental condition determining means approximates an inside air temperature of the other one of the first and second air conditioning zones based on the inside air temperature detected by the first inside air temperature sensor and a temperature difference between the desirable temperatures of the first and second air conditioning zones. Further, the environmental condition determining means approximates an inside air temperature of the other one of the third and fourth air conditioning zones based on the inside air temperature detected by the second inside air temperature sensor and a temperature difference between the desirable temperatures of the third and fourth air conditioning zones. Even in this case, the target blowing-out temperature of air to be blown to each air conditioning zone can be accurately calculated.

Alternatively, the environmental condition determining means includes an inside air temperature sensor for detecting an inside air temperature of one of the first and second air conditioning zones in the vehicle compartment. In this case, the environmental condition determining means approximates an inside air temperature of one of the third and fourth air conditioning zones based on the inside air temperature detected by the inside air temperature sensor and a temperature difference between the desirable temperatures of the one of the first and second air conditioning zones and the one of the third and fourth air conditioning zones. Further, the environmental condition determining means approximates an inside air temperature of the other one of the third and fourth air conditioning zones based on the inside air temperature detected by the inside air temperature sensor and a temperature difference between the desirable temperatures of the one of the first and second air conditioning zones and the other one of the third and fourth air conditioning zones. Thus, the target blowing-out temperature of air to be blown to each air conditioning zone can be also accurately calculated.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

First Embodiment

Figure 1:
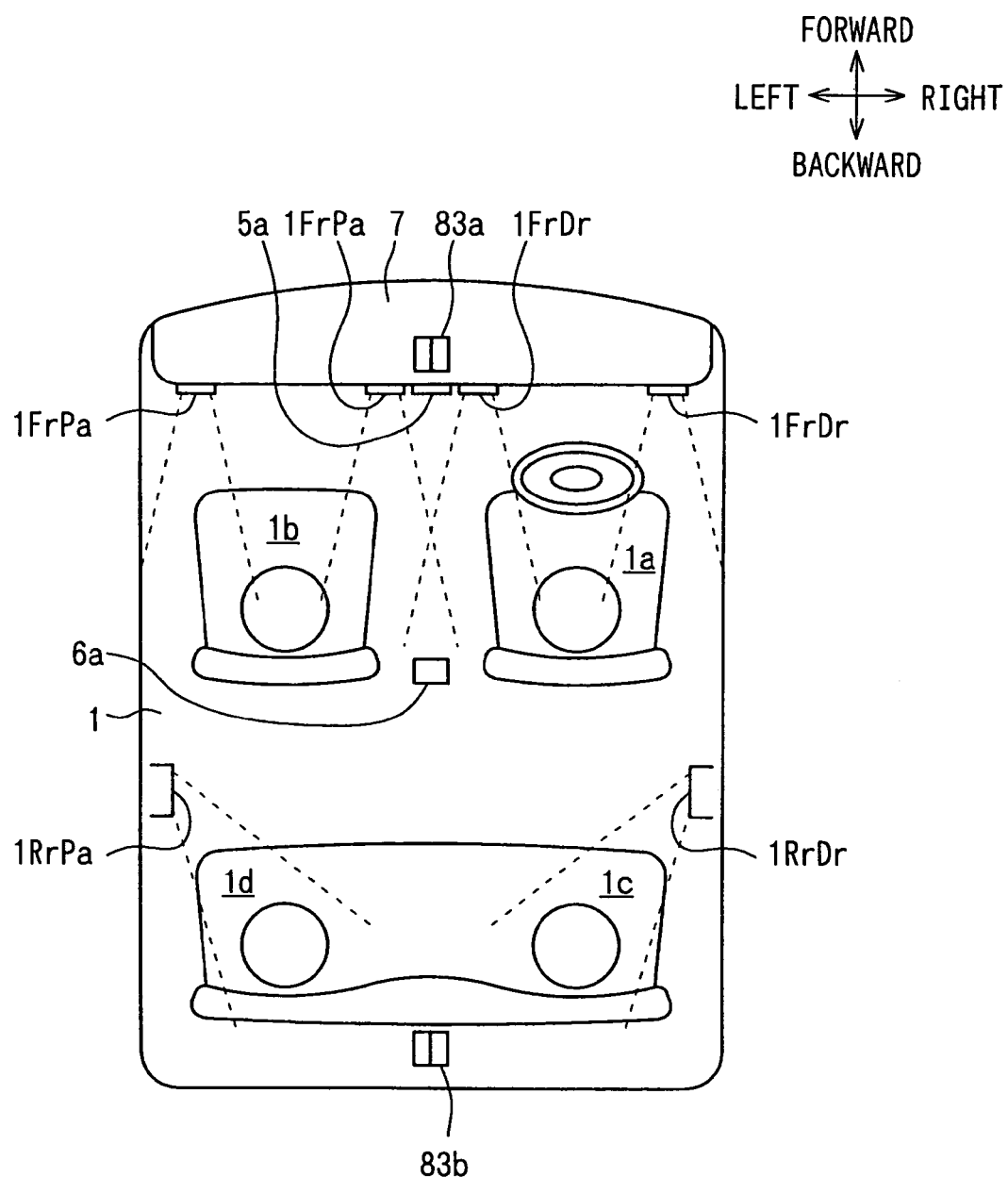
FIG. 1 is a schematic diagram showing first to fourth air conditioning zones of a vehicle compartment (passenger compartment) in which air conditioning control of an air conditioner for a vehicle according to embodiments of the present invention is performed.
Figure 2:
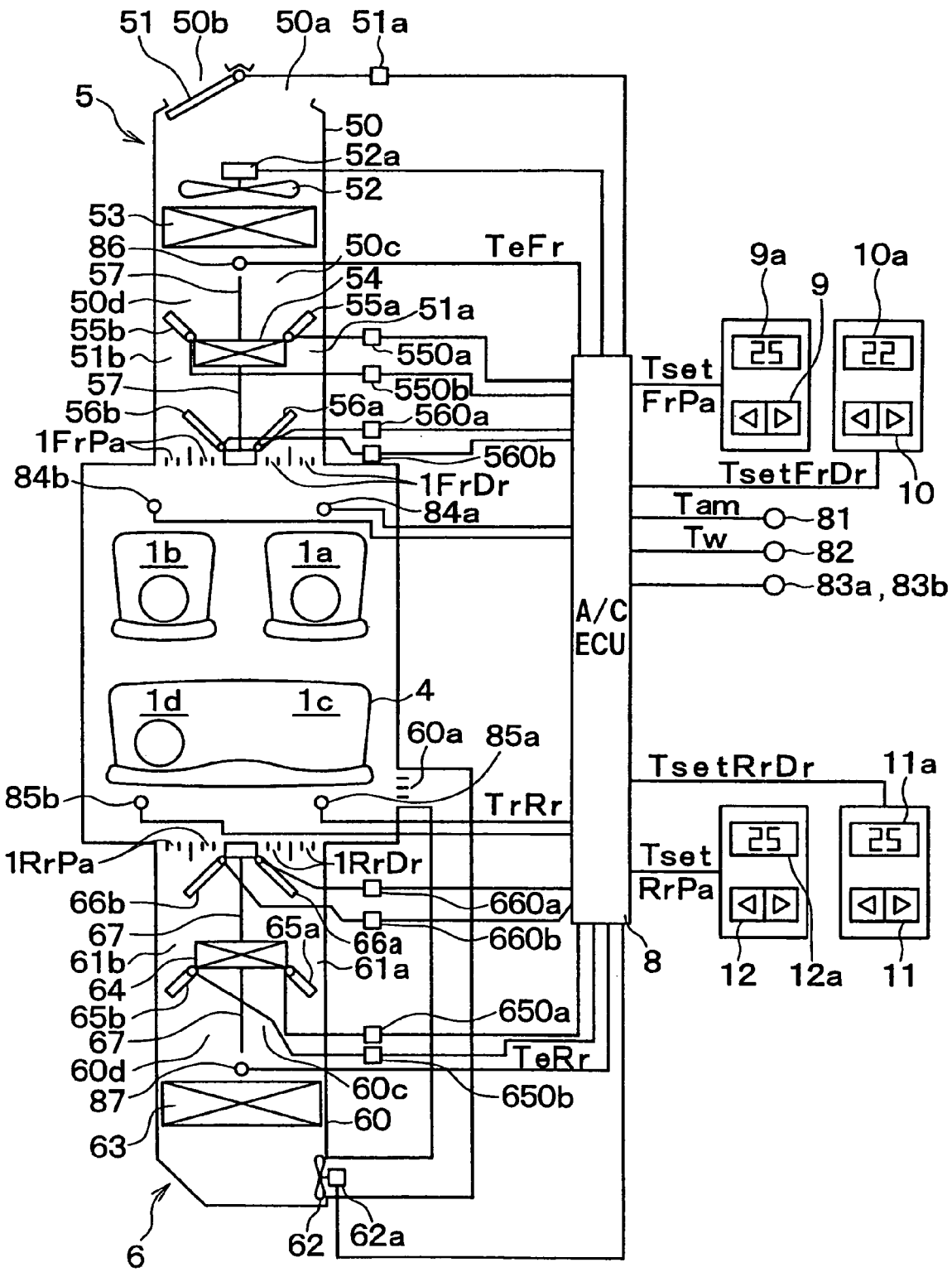
FIG. 2 is a schematic diagram showing a construction of the vehicle air conditioner according to a first embodiment of the present invention.

FIGS. 1 and 2 show a first embodiment of an air conditioner for a vehicle in the present invention. In this embodiment, the present invention is applied to an air conditioner for a vehicle for independently controlling each of air-conditioning operations of air conditioning zones $1a$, $1b$, $1c$, $1d$ located leftward and rightward on the front seat side and located leftward and rightward on the rear seat side within a vehicle compartment interior 1 (passenger compartment).

FIG. 1 is a schematic diagram showing the arrangement of the air conditioning zones $1a$, $1b$, $1c$, $1d$. The air conditioning zone $1a$ is located on the right-hand side in the front seat air conditioning zone. The air conditioning zone $1b$ is located on the left-hand side in the front seat air conditioning zone. The air conditioning zone $1c$ is located on the right-hand side in the rear seat air conditioning zone. The air conditioning zone $1d$ is located on the left-hand side in the rear seat air conditioning zone. The arrows of FIG. 1 show forward, backward, leftward and rightward directions of the vehicle.

FIG. 2 is an entire constructional view showing the entire construction of the vehicle air conditioner in this embodiment. This vehicle air conditioner is constructed by a front seat air conditioning system 5 for respectively independently air-conditioning the air conditioning zones $1a$, $1b$, and a rear seat air conditioning system 6 for respectively independently air-conditioning the air conditioning zones $1c$, $1d$. The front seat air conditioning system 5 is arranged inside an instrument panel 7 (dashboard). The rear seat air conditioning system 6 is arranged most backward in the vehicle compartment interior 1.

The front seat air conditioning system 5 has a duct 50 for sending and blowing air to the vehicle compartment interior 1. An inside air introducing inlet $50a$ for introducing inside air (i.e., air inside the passenger compartment) from the vehicle compartment interior 1 and an outside air introducing inlet $50b$ for introducing outside air (i.e., air outside the passenger compartment) from the vehicle compartment exterior are provided in this duct 50.

Further, an inside-outside air switching door 51 for selectively opening and closing the outside air introducing inlet $50b$ and the inside air introducing inlet $50a$ is arranged in the duct 50. A servo motor $51a$ as a driving means is connected to this inside-outside air switching door 51.

Further, a centrifugal type blower 52 for generating an air flow blown out toward the vehicle compartment interior 1 is arranged on an air downstream side of the outside air introducing inlet $50b$ and the inside air introducing inlet $50a$ within the duct 50. The centrifugal type blower 52 is constructed with a vane wheel and a blower motor $52a$ for rotating this vane wheel.

Further, an evaporator 53 as an air cooling means for cooling the air is arranged on an air downstream side of the centrifugal type blower 52 within the duct 50. A heater core 54 as an air heating means is arranged on an air downstream side of this evaporator 53 within the duct 50.

A partition plate 57 is arranged on an air downstream side of the evaporator 53 within the duct 50. This partition plate 57 partitions the interior of the duct 50 into a driver seat side passage $50c$ and an assistant driver seat side passage $50d$ (front-passenger's seat side passage).

Here, a bypass passage $51a$ is formed on a one side of the heater core 54 in the driver seat side passage $50c$. Through the bypass passage $51a$, cool air cooled by the evaporator 53 bypasses the heater core 54.

A bypass passage $51b$ is formed on the other side of the heater core 54 in the assistant driver seat side passage $50d$. Through the bypass passage $51b$, cool air cooled by the evaporator 53 bypasses the heater core 54.

Air mix doors $55a$, $55b$ are arranged on an air upstream side of the heater core 54. The air mix door $55a$ adjusts the ratio of an air amount passing through the heater core 54 and an amount passing through the bypass passage $51a$ in the cool air circulated in the driver seat side passage $50c$ in accordance with an open degree of the air mix door $55a$.

Further, the air mix door $55b$ adjusts the ratio of an air amount passing the heater core 54 and an air amount passing the bypass passage $51b$ in the cool air circulated in the assistant driver seat side passage $50d$ in accordance with an open degree of the air mix door $55b$.

Here, servo motors $550a$, $550b$ as driving means are respectively connected to the air mix doors $55a$, $55b$. The open degrees of the air mix doors $55a$, $55b$ are respectively adjusted by the servo motors $550a$, $550b$.

Further, the evaporator 53 is a heat exchanger constituting a well-known refrigerating cycle together with a compressor, a condenser, a liquid receiver and a pressure reducing device that are unillustrated. This evaporator 53 cools the air flowing into the duct 50.

The compressor is connected to an engine of the vehicle through an unillustrated electromagnetic clutch. The operation of this compressor is stopped and controlled by controlling connection and disconnection of the electromagnetic clutch.

The heater core 54 is a heat exchanger with engine cooling water (warm water) of the vehicle as a heat source. This heater core 54 heats the cool air after being cooled by the evaporator 53.

Further, a driver seat side face blowing-out port 1FrDr is opened on an air downstream side of the heater core 54 in the duct 50. The driver seat side face blowing-out port 1FrDr blows out the conditioned air toward the upper half of the body of a driver sitting on the driver seat 2 from-the driver seat side passage 50c.

Here, a blowing-out port switching door 56a for opening and closing the face blowing-out port 1FrDr is arranged in an air upstream portion of the face blowing-out port 1FrDr in the duct 50. This blowing-out port switching door 56a is opened and closed by a servo motor 560a as a driving means.

A driver seat side foot blowing-out port for blowing-out the conditioned air to the lower half of the body of the driver from the driver seat side passage 50c and a driver seat side defroster blowing-out port for blowing-out the conditioned air to a driver seat side area on the inner surface of a front glass are arranged in the duct 50 although these blowing-out ports are omitted in the drawings.

Blowing-out port switching doors for opening and closing the respective blowing-out ports are arranged in the air upstream portions of the driver seat side foot blowing-out port and the driver seat side defroster blowing-out port. The respective blowing-out port switching doors are opened and closed by the servo motors.

Further, the rear seat air conditioning system 6 has a duct 60 for sending and blowing air to the vehicle compartment interior 1. Only the inside air is introduced from the vehicle compartment interior 1 into this duct 60 through an inside air introducing inlet 60a.

Here, a centrifugal type blower 62 for generating the air flow blown out toward the vehicle compartment interior 1 is arranged on an air downstream side of the inside air introducing inlet 60a. The centrifugal type blower 62 is constructed with a vane wheel and a blower motor 62a for rotating this vane wheel.

Further, an evaporator 63 as an air cooling means for cooling the introduced air is arranged on an air downstream side of the centrifugal type blower 62 within the duct 60. A heater core 64 as an air heating means for heating the air is arranged on an air downstream side of this evaporator 53.

A partition plate 67 is arranged in a downstream portion of the evaporator 63 within the duct 60. This partition plate 67 partitions the interior of the duct 60 into a driver seat side passage 60c and an assistant driver seat side passage 60d (i.e., front-passenger's seat side passage).

Here, a bypass passage 61a is formed on a one side of the heater core 64 in the driver seat side passage 60c. Through the bypass passage 61a, cool air cooled by the evaporator 63 bypasses the heater core 64.

A bypass passage 61b is formed on the other side of the heater core 64 in the assistant driver seat side passage 60d. Through the bypass passage 61b, the cool air cooled by the evaporator 63 bypasses the heater core 64.

Air mix doors 65a, 65b are arranged on an air downstream side of the heater core 64. The air mix door 65a adjusts the ratio of an air amount passing through the heater core 64 and an air amount passing through the bypass passage 61a in the cool air circulated in the driver seat side passage 60c in accordance with an open degree of the air mix door 65a.

The air mix door 65b adjusts the ratio of an air amount passing through the heater core 64 and an air amount passing through the bypass passage 61b in the cool air passing the assistant driver seat side passage 60d in accordance with an open degree of the air mix door 65b.

Servo motors 650a, 650b as a driving means are respectively connected to the air mix doors 65a, 65b. The open degrees of the air mix doors 65a, 65b are respectively adjusted by the servo motors 650a, 650b.

Here, the evaporator 63 is piped and connected in parallel with the above evaporator 63 and is a heat exchanger constituting one constructional element of the above well-known refrigerating cycle.

The heater core 64 is a heat exchanger with the engine cooling water (warm water) of the vehicle as a heat source. The heater core 64 is connected to the above heater core 54 in parallel therewith, and heats the cool air after being cooled by the evaporator 63.

Further, a driver seat side face blowing-out port 1RrDr is opened on an air downstream side of the heater core 64 in the duct 60. The driver seat side face blowing-out port 1RrDr blows out the conditioned air toward the upper half of the body of a passenger (hereinafter called a rear seat right-hand side passenger) sitting on the right-hand side (i.e., the rear side of the driver seat) of a rear seat 4 from the driver seat side passage 60c.

Here, a blowing-out port switching door 66a for opening and closing the face blowing-out port 1RrDr is arranged in an air upstream portion of the face blowing-out port 1RrDr. This blowing-out port switching door 66a is opened and closed by a servo motor 660a as a driving means.

A driver seat side foot blowing-out port for blowing out the conditioned air to the lower half of the body of the rear seat right-hand side passenger from the driver seat side passage 60c is arranged in the duct 60 although this driver seat side foot blowing-out port is omitted in the drawings.

Further, a blowing-out port switching door for opening and closing this foot blowing-out port is arranged in an air upstream portion of the driver seat side foot blowing-out port. This blowing-out port switching door is opened and closed by the servo motor.

A face blowing-out port 1RrPa is opened on an air downstream side of the heater core 64 in the duct 60. This face blowing-out port 1RrPa blows out the conditioned air toward the upper half of the body of a passenger (hereinafter called a rear seat left-hand side passenger) sitting on the left-hand side (i.e., the rear side of the assistant driver seat) of the rear seat from the assistant driver seat side passage 60d.

Here, a blowing-out port switching door 66b for opening and closing the face blowing-out port 1RrPa is arranged in an air upstream portion of the face blowing-out port 1RrPa. This blowing-out port switching door 66b is opened and closed by a servo motor 660b as a driving means.

A foot blowing-out port for blowing out the conditioned air to the lower half of the body of the rear seat left-hand side passenger from the assistant driver seat side passage 60 d is arranged in the duct 60 although this foot blowing-out port is omitted in the drawings. A blowing-out port switching door for opening and closing this foot blowing-out port is arranged in an air upstream portion of this foot blowing-out port. This foot blowing-out port switching door is opened and closed by the servo motor.

Further, an electronic controller (hereinafter called an air conditioning ECU 8) for controlling each of the air conditioning operations of the front seat air conditioning system 5 and the rear seat air conditioning system 6 is arranged in the vehicle air conditioner.

An outside air temperature sensor 81, a cooling water temperature sensor 82, a solar radiation sensor 83a, a solar radiation sensor 83*b* and inside air temperature sensors 84*a*, 84*b*, 85*a*, 85*b* are connected to the air conditioning ECU 8. The outside air temperature sensor 81 detects an outside air temperature Tam outside the vehicle compartment. The cooling water temperature sensor 82 detects a cooling water temperature Tw of the engine. The solar radiation sensor 83*a* detects each of a solar radiation amount Ts_fr irradiated to the front right-hand side seat (driver seat) and a solar radiation amount Ts_fl irradiated to the front left-hand side seat (assistant driver seat). The solar radiation sensor 83*b* detects each of a solar radiation amount Ts_rr irradiated to the rear right-hand side seat and a solar radiation amount Ts_rl irradiated to the rear left-hand side seat. The inside air temperature sensors 84*a*, 84*b*, 85*a*, 85*b* detect respective inside air temperatures TrFDr, TrFPa, TrRDr, TrRPa of the air conditioning zones 1*a*, 1*b*, 1*c*, 1*d*.

Further, a temperature sensor 86, a temperature sensor 87 and temperature setting switches 9, 10, 11, 12 are connected to the air conditioning ECU 8. The temperature sensor 86 detects a temperature (hereinafter called an evaporator blowing-out temperature TeFr) of the cool air blown out of the evaporator 53. The temperature sensor 87 detects a temperature (hereinafter called an evaporator blowing-out temperature TeRr) of the cool air blown out of the evaporator 63. The temperature setting switches 9, 10, 11, 12 set desirable temperatures TsetFrDr, TsetFrPa, TsetRrDr, TsetRrPa of the air conditioning zones 1*a*, 1*b*, 1*c*, 1*d* by a passenger.

Displays 9*a*, 10*a*, 11*a*, 12*a* as desirable temperature display means for displaying the setting contents of the desirable temperatures, etc. are respectively arranged in the vicinity of the temperature setting switches 9, 10, 11, 12.

Further, the air conditioning ECU 8 is a well-known device constructed with an analog/digital converter, a microcomputer, etc. The air conditioning ECU 8 is constructed such that output signals respectively outputted from sensors 81, 82, 83, 84*a*, 84*b*, 85*a*, 85*b*, 86, 87 and switches 9, 10, 11, 12 are analog/digital-converted by the analog/digital converter and are inputted to the microcomputer.

The microcomputer is a well-known microcomputer constructed with a memory such as a ROM, a RAM, etc., and a CPU (central processing unit), etc. When an ignition switch is turned on, electric power is supplied from an unillustrated battery to the microcomputer.

Figure 3:
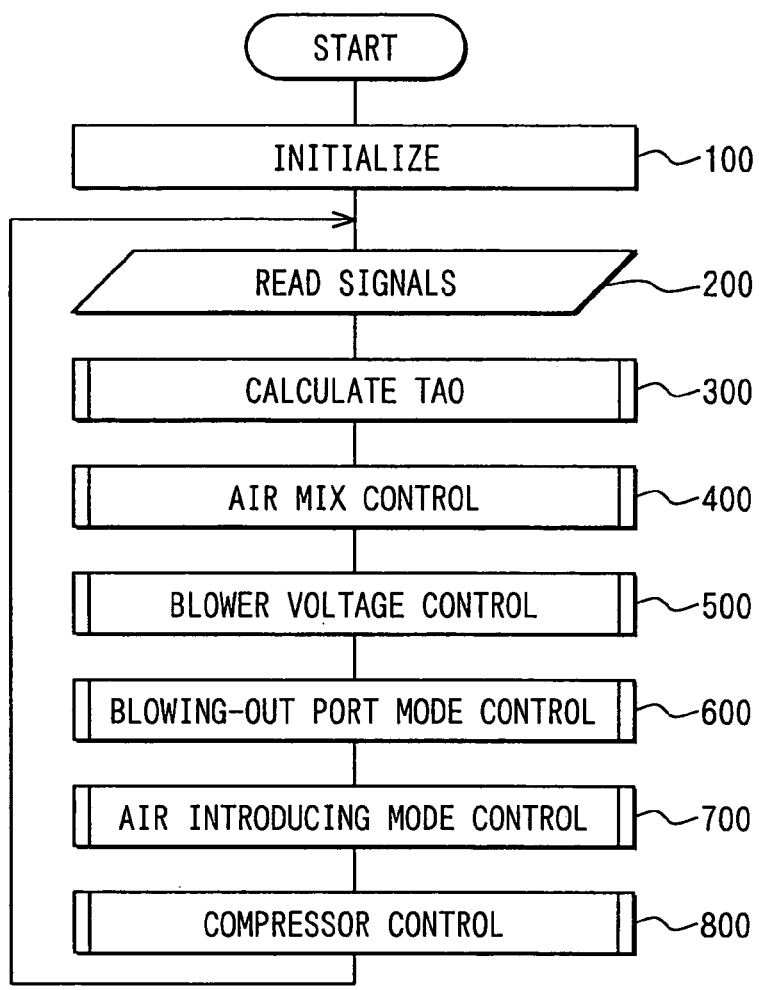
FIG. 3 is a flow diagram showing a control processing of an air conditioning ECU of FIG. 2.
Figure 4:
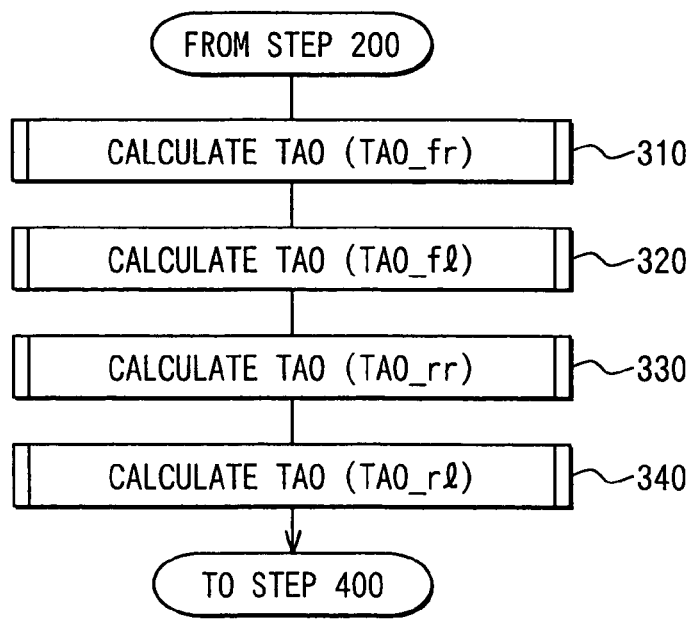
FIG. 4 is a flow diagram showing a detail control of step 300 in FIG. 3.
Figure 5:
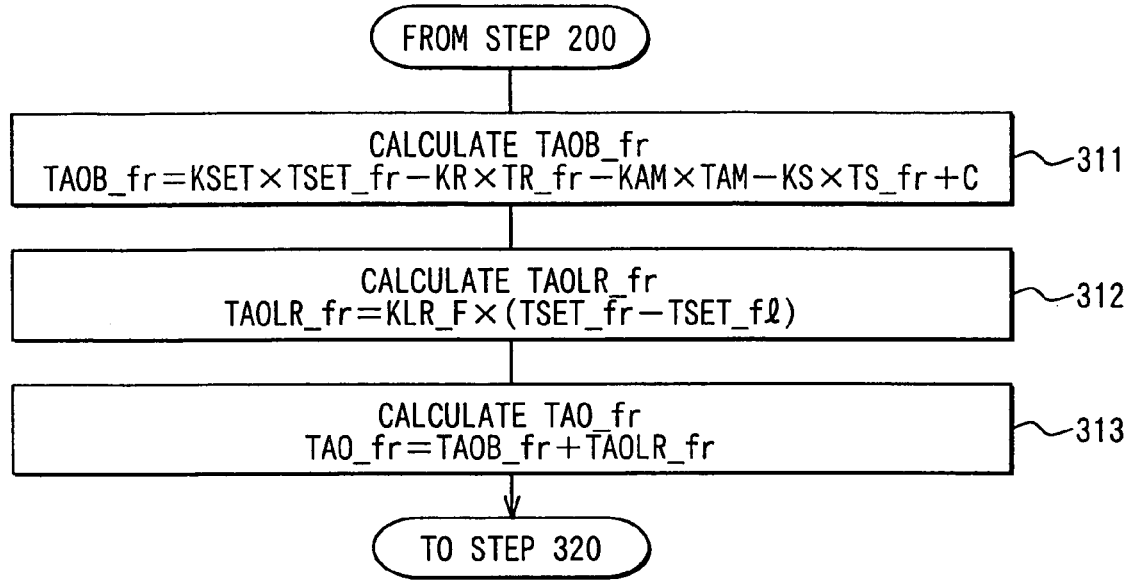
FIG. 5 is a flow diagram showing a detail control of step 310 in FIG. 4.
Figure 6:
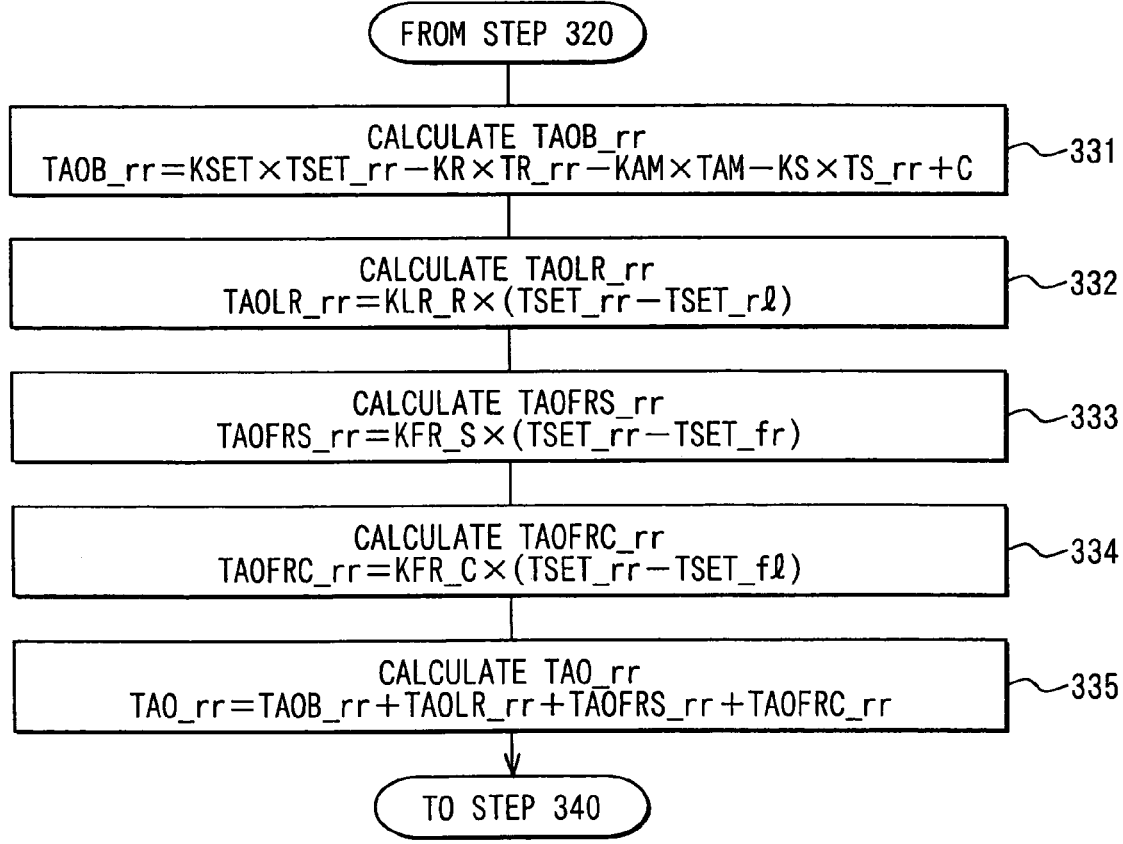
FIG. 6 is a flow diagram showing a detail control of step 330 in FIG. 4.

The operation of this embodiment will next be described by using FIGS. 3 to 9. FIG. 3 is a flow chart showing automatic air conditioning control processing of the air conditioning ECU 8. FIG. 4 is a flow chart showing the processing of step 300 within FIG. 3 in detail. FIG. 5 is a flow chart showing the processing of step 310 within FIG. 4 in detail. FIG. 6 is a flow chart showing the processing of step 330 within FIG. 4 in detail.

The microcomputer of the air conditioning ECU 8 executes a computer program stored to the memory in accordance with the flow chart shown in FIG. 3. The execution of this computer program is started when the ignition switch is turned on.

Specifically, when the RAM, etc. are reset (initialized) (step 100), it proceeds to step 200, and digital signals (Tam, Tw, Ts_fr, Ts_fl, Ts_rr, Ts_rl, TsDr, TsPa, TrFDr, TrFPa, TrRDr, TrRPa, TeFr, TeRr) obtained by analog/digital-converting the detecting signals of the sensors 81, 82, 83, 84*a*, 84*b*, 85*a*, 85*b*, 86, 87 are read (step 200).

In addition to this, the desirable set temperatures (TsetFrDr, TsetFrPa, TsetRrDr, TsetRrPa) set by the temperature setting switches 9, 10, 11, 12 are read.

Next, target blowing-out temperatures (TAO) of the air blown out to the air conditioning zones 1*a*, 1*b*, 1*c*, 1*d* are calculated every air conditioning zone on the basis of formulas 1 to 4 stored to the memory in advance by using the digital signals and the desirable temperatures read in this way (step 300).

In the formulas 1 to 4 for calculating the target blowing-out temperatures every air conditioning zone, the index _fr shows the air conditioning zone 1*a* of the front seat right-hand side. The index _fl shows the air conditioning zone 1*b* of the front seat left-hand side. The index _rr shows the air conditioning zone 1*c* of the rear seat right-hand side. The index _rl shows the air conditioning zone 1*d* of the rear seat left-hand side. The respective meanings in the formulas 1 to 4 will be described later.

For example, the target blowing-out temperature (TAO) of the air conditioning zone 1*a* of the front seat right-hand side is set to be shown by TAO_fr. The target blowing-out temperature (TAO) of the air conditioning zone 1*b* of the front seat left-hand side is set to be shown by TAO_fl. The target blowing-out temperature (TAO) of the air conditioning zone 1*c* of the rear seat right-hand side is set to be shown by TAO_rr. The target blowing-out temperature (TAO) of the air conditioning zone 1*d* of the rear seat left-hand side is set to be shown by TAO_rl.

First, the target blowing-out temperature TAO_fr of the air conditioning zone 1*a* of the front seat right-hand side is calculated by using the formula 1 (step 310).

$$TAO\_fr = KSET \times TSET\_fr - KR \times TR\_fr - KAM \times TAM - KS \times TS\_fr + C + KLR\_F \times (TSET\_fr - TSET\_fl) \quad \text{(formula 1)}$$

Concretely, a base TAOB_fr of the air conditioning zone 1*a* of the front seat right-hand side shown below is calculated (step 311).

$$TAOB\_fr = KSET \times TSET\_fr - KR \times TR\_fr - KAM \times TAM - KS \times TS\_fr + C$$

Further, the following correction term TAOLR_fr for correcting a front seat left-right desirable temperature difference (front seat left-right setting temperature difference) is calculated (step 312).

$$TAOLR\_fr = KLR\_F \times (TSET\_fr - TSET\_fl)$$

Thereafter, the target blowing-out temperature TAO_fr of the air conditioning zone 1*a* of the front seat right-hand side is calculated by adding the base TAOB_fr and the correction term TAOLR_fr (step 313).

Further, the target blowing-out temperature TAO_fl of the air conditioning zone 1*b* of the front seat left-hand side is calculated by using the formula 2 (step 320).

$$TAO\_fl = KSET \times TSET\_fl - KR \times TR\_fl - KAM \times TAM - KS \times TS\_fl + C + KLR\_F \times (TSET\_fl - TSET\_fr) \quad \text{(formula 2)}$$

Further, the target blowing-out temperature TAO_rr of the air conditioning zone 1*c* of the rear seat right-hand side is calculated by using the formula 3 (step 330).

$$TAO\_rr = KSET \times TSET\_rr - KR \times TR\_rr - KAM \times TAM - \qquad \text{(formula 3)}$$
$$KS \times TS\_rr + C + KLR\_R \times (TSET\_rr - TSET\_rl) +$$
$$KFR\_S \times (TSET\_rr - TSET\_fr) +$$
$$KFR\_C \times (TSET\_rr - TSET\_fl)$$

Concretely, the following base TAOB_rr of the air conditioning zone 1c of the rear seat right-hand side is calculated (step 331).

$$TAOB\_rr =$$
$$KSET \times TSET\_rr - KR \times TR\_rr - KAM \times TAM - KS \times TS\_rr + C$$

Next, the following correction term TAOLR_rr for correcting a rear seat left-right desirable temperature difference (rear seat left-right setting temperature difference) is calculated (step 332).

$$TAOLR\_rr = KLR\_R \times (TSET\_rr - TSET\_rl)$$

Next, the following correction term TAOFRS_rr for correcting the desirable temperature difference (setting temperature difference) between the rear seat right-hand side and the front seat right-hand side is calculated (step 333).

$$TAOFRS\_rr = KFR\_S \times (TSET\_rr - TSET\_fr)$$

Next, the following correction term TAOFRC_rr for correcting the desirable temperature difference (setting temperature difference) between the rear seat right-hand side and the front seat left-hand side is calculated (step 334).

$$TAOFRC\_rr = KFR\_C \times (TSET\_rr - TSET\_fl)$$

Next, the target blowing-out temperature TAO_rr is calculated by adding the base TAOB_rr, the correction term TAOLR_rr, the correction term TAOFRS_rr and the correction term TAOFRC_rr (step 335).

Next, the target blowing-out temperature TAO_rl of the air conditioning zone 1d of the rear seat left-hand side is calculated by using the formula 4 (step 340).

$$TAO\_rl = KSET \times TSET\_rl - KR \times TR\_rl - KAM \times TAM - \qquad \text{(formula 4)}$$
$$KS \times TS\_rl + C + KLR\_R \times (TSET\_rl - TSET\_rr) +$$
$$KFR\_S \times (TSET\_rl - TSET\_fl) +$$
$$KFR\_C \times (TSET\_rl - TSET\_fr)$$

Here, KSET, KR, KAM, KS, KLR_F, KLR_R, KFR_S and KFR_C are respectively coefficients, and C is a constant.

TSET_i is the desirable temperature (set temperature) every air conditioning zone, and TR_i is the air temperature (inside air temperature) every air conditioning zone. TAM is the outside air temperature and TS_i is the solar radiation amount every air conditioning zone ("i" indicates one of fr, fl, rr and rl).

Further, values different every air conditioning zone may be set as KSET, KR, KAM, KS, KLR_F, KLR_R, KFR_S, KFR_C and C. Further, different values may be also set in accordance with the air temperature, the solar radiation amount and the desirable temperature every air conditioning zone.

Next, it proceeds to step 400 and respective target open degrees SW_fr, SW_fl, SW_rr, SW_rl of the air mix doors 55a, 55b, 65a, 65b are calculated by using the target blowing-out temperature (TAO_fr, TAO_fl, TAO_rr, TAO_rl) every air conditioning zone calculated in the step 300 on the basis of the formula 5 stored to the memory in advance.

$$SW\_i = \{(TAO\_i - Te)/(Tw - Tei)\} \times 100(\%)$$

Reference numeral "i" designates one of fr, fl, rr and rl. When one of the target blowing-out temperatures TAO_fr and TAO_fl is calculated, an evaporator blowing-out temperature TeFr is used as the Tei. In contrast to this, when one of the target blowing-out temperatures TAO_rr and TAO_rl is calculated, an evaporator blowing-out temperature TeRr is used as the Tei.

Here, on the basis of these determined open degrees SW_fr, SW_fl, SW_rr, SW_rl, the air mix doors 55a, 55b, 65a, 65b are individually operated by controlling the operations of the servo motors 560a, 560b, 660a, 660b.

In accordance with this operation, the respective open degrees of the air mix doors 55a, 55b, 65a, 65b approach the target open degrees SW_fr, SW_fl, SW_rr, SW_rl.

Figure 7:
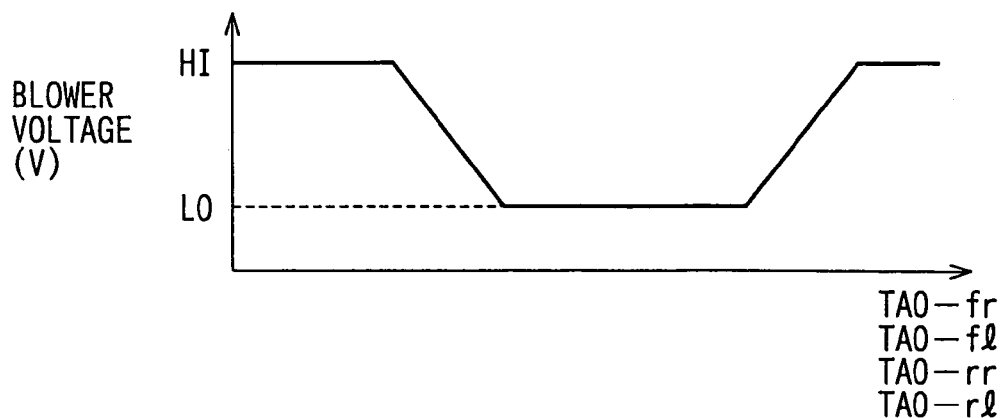
FIG. 7 is a characteristic view of the air conditioning ECU of FIG. 2, for determining a blower voltage.

Next, blower voltages (VM_fr, VM_fl, VM_rr, VM_rl) respectively required in the air conditioning zones 1a, 1b, 1c, 1d (i.e., air amounts respectively required in the air conditioning zones 1a, 1b, 1c, 1d) are calculated by using the characteristics of FIG. 7 stored to the memory in advance and the target blowing-out temperatures (TAO_fr, TAO_fl, TAO_rr, TAO_rl).

Here, the blower voltages VM_fr, VM_fl respectively required in the air conditioning zones 1a, 1b are averaged by using the following formula 5 stored to the memory in advance, and the blower voltage VMF required in the front seat air conditioning zones is calculated.

$$VMF = (VM\_fr + VM\_fl)/2 \qquad \text{(formula 5)}$$

When the blower voltage VMF is calculated in this way, this blower voltage VMF is applied to the blower motor 52a. In accordance with this application, the centrifugal type blower 52 generates an air flow.

Further, the blower voltages VM_rr, VM_rl respectively required in the air conditioning zones 1c, 1d are averaged by using the following formula 6 stored to the memory in advance, and the blower voltage VMR required in the rear seat air conditioning zones are calculated.

$$VMR = (VM\_rr + VM\_rl)/2 \qquad \text{(formula 6)}$$

When the blower voltage VMR is calculated in this way, this blower voltage VMR is applied to the blower motor 62b. In accordance with this application, the centrifugal type blower 62 generates an air flow.

Figure 8:
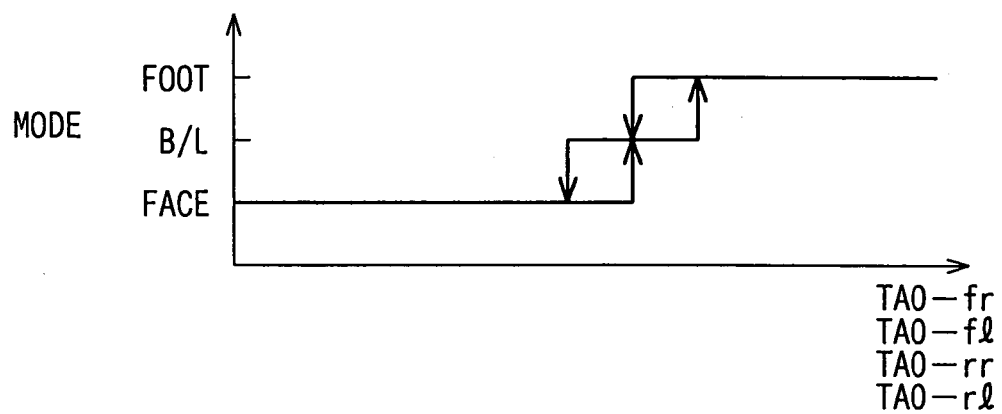
FIG. 8 is a characteristic view of the air conditioning ECU of FIG. 2, for determining a blowing-out port mode.

Next, one of a foot mode (FOOT), a bi-level mode (B/L) and a face mode (FACE) is determined as a blowing-out port mode every air conditioning zone by using the characteristics of FIG. 8 stored to the memory in advance and the target blowing-out temperatures (TAO_fr, TAO_fl, TAO_rr, TAO_rl) (step 600).

Here, the face mode is a mode for blowing-out the conditioned air from only a face blowing-out port. The foot mode is a mode for blowing-out the conditioned air from mainly a foot blowing-out port. The bi-level mode is a mode for blowing-out the conditioned air from both the face blowing-out port and the foot blowing-out port.

When the blowing-out port mode (air outlet mode) is determined every air conditioning zone in this way, the operations of the respective servo motors of the blowing-out port switching doors are controlled every air conditioning zone, and the respective blowing-out port switching doors are opened and closed so as to set the determined blowing-out port mode every air conditioning zone.

Figure 9:
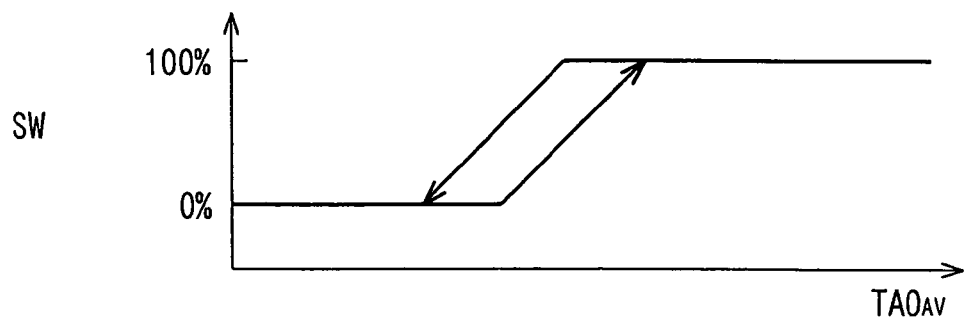
FIG. 9 is a characteristic view of the air conditioning ECU of FIG. 2, for determining a target open degree SW of an inside-outside air switching door.

Next, the target open degree SW1 of the inside-outside air switching door 51 of the front seat air conditioning system 5 is calculated by using the characteristics of FIG. 9 stored to the memory in advance and the target blowing-out temperatures (TAO_fr, TAO_fl) (step 700).

That is, an average value TAOav {=(TAO_fr+TAO_fl)/2} of the target blowing-out temperatures TAO_fr, TAO_fl is calculated and the target open degree SW1 of the inside-outside air switching door 51 corresponding to the average value TAOav is calculated on the basis of the characteristics of FIG. 7 stored to the memory in advance.

In this embodiment, the target open degree of SW1=100% is set when the inside air introducing inlet 50a is completely closed and the outside air introducing inlet 50b is completely opened. The target open degree of SW1=0% is set when the inside air introducing inlet 50a is completely opened and the outside air introducing inlet 50b is completely closed.

When the target open degree SW1 is determined in this way, the operation of the servo motor 51a is controlled on the basis of this target open degree SW1 such that the open degree of the inside-outside air switching door 51 approaches the target open degree SW1.

Next, the operation of an electromagnetic clutch connected between the engine of the vehicle and the compressor is controlled so as to be connected and disconnected such that the evaporator blowing-out temperatures TeFr, TeRr approach predetermined temperatures (step 800).

In accordance with this control, a flow rate of a refrigerant flowing into the refrigerating cycle is controlled and cooling performance of the evaporators 53, 63 is adjusted. Therefore, it is returned to the step 200 and the respective control processings of steps 400, 500, 600, 700, 800 are repeated.

As described above, air is introduced from at least one of the inside air introducing inlet 50a and the outside air introducing inlet 50b into the duct 50 in the front seat air conditioning system 5. This introduced air is thermally exchanged with the refrigerant passing through the evaporator 53, and is cooled and flowing into the driver seat side passage 50c and the assistant driver seat side passage 50d.

Here, the ratio of an air amount passing through the heater core 54 and an air amount passing through the bypass passage 51a is adjusted by the air mix door 55a in the driver seat side passage 50c. Thereafter, the air passing through the heater core 54 and the air passing through the bypass passage 51a are mixed with each other to obtain the conditioned air in the drive seat side passage 50c.

Thus, the temperature of the air flowing through the driver seat side passage 50c is adjusted. Thereafter, this conditioned air adjusted in temperature is blown out from at least one of the blowing-out ports opened correspondingly to the blowing-out port mode of the air conditioning zone 1a determined as described above.

Further, the ratio of an air amount passing through the heater core 54 and an air amount passing through the bypass passage 51b is adjusted by the air mix door 55b in the assistant driver seat side passage 50d. Thereafter, the air passing through the heater core 54 and the air passing through the bypass passage 51b are mixed with each other to obtain the conditioned air in the assistant drive seat side passage 50d.

Thus, the temperature of the air flowing through the assistant driver seat side passage 50d is adjusted. Thereafter, this conditioned air adjusted in temperature is blown out from at least one of the blowing-out ports opened correspondingly to the blowing-out port mode of the air conditioning zone 1b determined as described above.

Further, inside air is introduced from the inside air introducing inlet 60a into the duct 60 in the rear seat air conditioning system 6. This introduced air is thermally exchanged with the refrigerant passing through the evaporator 63 and is cooled and flowing into the driver seat side passage 60c and the assistant driver seat side passage 60d.

Here, the ratio of an air amount passing through the heater core 64 and an air amount passing through the bypass passage 61a is adjusted by the air mix door 65a in the driver seat side passage 60c. Thereafter, the air passing through the heater core 64 and the air passing through the bypass passage 61a are mixed with each other.

Thus, the temperature of the air (conditioned air) flowing into the driver seat side passage 60c is adjusted. Thereafter, this conditioned air adjusted in temperature is blown out from at least one of the blowing-out ports opened correspondingly to the blowing-out port mode of the air conditioning zone 1c determined as described above.

Further, the ratio of an air amount passing through the heater core 64 and an air amount passing through the bypass passage 61b is adjusted by the air mix door 65b in the assistant driver seat side passage 60d. Thereafter, the air passing through the heater core 64 and the air passing through the bypass passage 61b are mixed with each other.

Thus, the temperature of the air (conditioned air) flowing into the assistant driver seat side passage 60d is adjusted. Thereafter, this conditioned air adjusted in temperature is blown out from at least one of the blowing-out ports, opened correspondingly to the blowing-out port mode of the air conditioning zone id determined as described above.

Next, the meanings of the formulas 1 to 4 for calculating the target blowing-out temperature every air conditioning zone will be explained below by comparing this target blowing-out temperature with a general target blowing-out temperature TAO shown in the following formula 7.

$$TAO = KSET \times TSET - KR \times TR - KAM \times TAM - KS \times TS + C \quad \text{(formula 7)}$$

In this formula 7, TSET is the desirable temperature and TR is the inside air temperature, TAM is the outside air temperature and TS is the solar radiation amount. KSET, KR, KAM and KS are respectively coefficients and C is a constant.

Here, the formula 1 showing the target blowing-out temperature TAO_fr of the front right-hand side seat is again shown below.

$$TAO\_fr = KSET \times TSET\_fr - KR \times TR\_fr - KAM \times TAM - KS \times TS\_fr + C + KLR\_F \times (TSET\_fr - TSET\_fl) \quad \text{(formula 1)}$$

In the formula 1, the term of KLR_F×(TSET_fr−TSET_fl) is added to the formula 7. This term is a term for correcting the interferences of an air flow and an air temperature of the front right-hand side seat affected by the front left-hand side seat when there is a desirable temperature difference between the front left and right seats. This term is also a term for holding an independent temperature control of the front seat left and right side temperatures.

For example, when the desirable temperature (TSET_fl) of the front seat left-hand side is set so as to be higher than the desirable temperature (TSET_fr) of the front seat right-hand side, the air conditioning zone 1a of the front right-hand side seat is affected by a warm air flow of the front left-hand side seat. Accordingly, this influence is corrected by lowly setting the target blowing-out temperature TAO_fr of the front right-hand side seat by KLR_F×(TSET_fr−TSET_fl).

Next, the formula 2 showing the target blowing-out temperature TAO_fl of the air conditioning zone $1b$ of the front seat left-hand side is again shown below.

$$TAO\_fl = KSET \times TSET\_fl - KR \times TR\_fl - KAM \times TAM - \quad \text{(formula 2)}$$
$$KS \times TS\_fl + C + \text{KLR\_F} \times (TSET\_fl - TSET\_fr)$$

The term of KLR_F×(TSET_fl−TSET_fr) is added to the formula 7 as this target blowing-out temperature TAO_fl on the basis of the same idea as TAO_fr of the front right-hand side seat of the formula 1.

Next, the formula 3 showing the target blowing-out temperature TAO_rr of the air conditioning zone $1c$ of the rear seat right-hand side is again shown below.

$$TAO\_rr = KSET \times TSET\_rr - KR \times TR\_rr - KAM \times TAM - \quad \text{(formula 3)}$$
$$KS \times TS\_rr + C + \text{KLR\_R} \times (TSET\_rr - TSET\_rl) +$$
$$\text{KFR\_S} \times (TSET\_rr - TSET\_fr) +$$
$$\text{KFR\_C} \times (TSET\_rr - TSET\_fl)$$

Here, in the formula 3, the respective terms of KLR_R×(TSET_rr−TSET_rl), KFR_S×(TSET_rr−TSET_fr) and KFR_C×(TSET_rr−TSET_fl) are added to the formula 7.

Here, with respect to KLR_R×(TSET_rr−TSET_rl), an idea similar to that in the case of the target blowing-out temperature TAO_fr of the front seat right-hand side is applied to the target blowing-out temperature of the rear seat right-hand side, and a correction with respect to the desirable temperature difference between the left and right seats of the rear seat is performed.

Further, in the vehicle air conditioner, the air flows from the forward direction (front side) of the vehicle toward the backward direction (rear side) in the vehicle compartment interior 1. Accordingly, the rear-seat air conditioning operation is affected by the interferences of the air flow and the air temperature on the front seat. Therefore, the terms of KFR_S×(TSET_rr−TSET_fr) and KFR_C×(TSET_rr−TSET_fl) are added as correction terms of these interferences.

Here, KFR_S×(TSET_rr−TSET_fr) is a correction (correction with respect to the influence from the just front seat) with respect to the influence from the front seat to the rear seat caused by the difference between the front seat right-hand side desirable temperature and the rear seat right-hand side desirable temperature.

Further, KFR_C×(TSET_rr−TSET_fl) is a correction (correction with respect to the influence from a slanting forward seat) with respect to the influence from the front seat to the rear seat caused by the difference between the front seat left-hand side desirable temperature and the rear seat right-hand side desirable temperature.

Next, the formula 4 showing the target blowing-out temperature TAO_rl of the air conditioning zone $1d$ of the rear seat left-hand side is again shown below.

$$TAO\_rl = KSET \times TSET\_rl - KR \times TR\_rl - KAM \times TAM - \quad \text{(formula 4)}$$
$$KS \times TS\_rl + C + \text{KLR\_R} \times (TSET\_rl - TSET\_rr) +$$
$$\text{KFR\_S} \times (TSET\_rl - TSET\_fl) +$$
$$\text{KFR\_C} \times (TSET\_rl - TSET\_fr)$$

Here, in the formula 4, the terms of KLR_R×(TSET_rl−TSET_rr), KFR_S×(TSET_rl−TSET_fl) and KFR_C×(TSET_rl−TSET_fr) are added to the formula 5 on the basis of the same idea as the target blowing-out temperature TAO_rr of the air conditioning zone $1c$ of the rear seat right-hand side.

Actually, an interference of temperature from the rear seat to the front seat is also caused, but this interference is small in comparison with the influence from the front seat to the rear seat. Accordingly, this influence from the rear seat to the front seat is not considered in the calculation of the target blowing-out temperatures TAO_fr and TAO_fl. Namely, no correction between the front seat and the rear seat is performed in the calculation of the target blowing-out temperatures TAO_fr and TAO_fl of the formulas 1 and 2.

The operating effects of this embodiment will next be explained. Here, the air conditioner used for the vehicle having the air conditioning zones $1a$, $1b$, $1c$, $1d$ located rightward and leftward in the front seat and also located leftward and rightward in the rear seat within the vehicle compartment. The vehicle air conditioner has sensors 81, 83a, 83b, 84a, 84b, 85a, 85b for respectively detecting the outside air temperature, the solar radiation amount and the inside air temperature of the air conditioning zones $1a$, $1b$, $1c$, $1d$ as an environmental condition. The vehicle air conditioner also has temperature setting switches 9 to 11 for setting the respective desirable temperatures of the air conditioning zones $1a$, $1b$, $1c$, $1d$.

Here, the air conditioning ECU 8 respectively calculates the target blowing-out temperature every air conditioning zone in accordance with the inside air temperature, the solar radiation amount and the outside air temperature detected by the sensors 81, 83a, 83b, 84a, 84b, 85a, 85b, and the respective desirable temperatures of the air conditioning zones $1a$, $1b$, $1c$, $1d$. In addition to this, the air conditioning ECU 8 respectively independently controls the temperature of the air blown out to the air conditioning zones $1a$, $1b$, $1c$, $1d$ so as to become the target blowing-out temperature.

Here, the air conditioning ECU 8 calculates the individual target blowing-out temperatures of the air conditioning zones $1a$, $1b$, $1c$, $1d$ so as to correct the influence from the other air conditioning zones by using the desirable temperatures of the air conditioning zones $1a$, $1b$, $1c$, $1d$.

The target blowing-out temperatures of the air conditioning zones $1a$, $1b$ are calculated so as to correct the influence due to the difference (TSET_fl−TSET_fr) between the desirable temperatures of the front seat left and right sides.

Further, the target blowing-out temperatures of the air conditioning zones $1c$, $1d$ are calculated so as to correct the influence (i.e., influence due to the desirable temperature difference between the rear seat left and right sides) due to the desirable temperature difference (e.g., TSET_rl−TSET_rr) between the air conditioning zones $1c$ and $1d$ and also to correct the influence (i.e., influence from the front seat side) due to the desirable temperature difference (e.g., TSET_rr−TSET_fr and TSET_rr−TSET_fl) between the air conditioning zone 1c, 1d and the air conditioning zone 1a, 1b.

Since the blown-out air temperature is controlled every air conditioning zone by using the target blowing-out temperature calculated in this way, the air temperatures of the air conditioning zones 1a, 1b, 1c, 1d can be respectively independently controlled to comfortable temperatures even when the desirable temperatures of the air conditioning zones 1a, 1b, 1c, 1d are independently changed.

Second Embodiment

In the above-described first embodiment, the inside air temperature sensors 84a, 84b, 85a, 85b are respectively adopted correspondingly to the air conditioning zones 1a, 1b, 1c, 1d, and the target blowing-out temperature is calculated every air conditioning zone by using the detected inside air temperatures of these inside air temperature sensors 84a, 84b, 85a, 85b. However, instead of this construction, a case where only two inside air temperature sensors are arranged will be explained in this second embodiment. One inside air temperature sensor is arranged leftward or rightward in the front seat and the other one inside air temperature sensor is arranged leftward or rightward in the rear seat.

A case where the inside air temperature sensor 84a is arranged in the air conditioning zone 1a of the front right-hand side seat and the inside air temperature sensor 85a is arranged in the air conditioning zone 1c of the rear right-hand side seat and no inside air temperature sensor is arranged in the air conditioning zone 1b of the front left-hand side seat and in the air conditioning zone 1d of the rear left-hand side seat will next be described.

In this case, the air conditioning ECU 8 calculates the respective target blowing-out temperatures TAO_fr, TAO_fl, TAO_rr, TAO_rl of the air conditioning zones 1a, 1b, 1c, 1d on the basis of the following formulas 8 to 11 (estimating means).

$$TAO\_fr = KSET \times TSET\_fr - KR \times TR\_fr - KAM \times TAM - KS \times TS\_fr + C + KLR\_F \times (TSET\_fr - TSET\_fl) \quad \text{(formula 8)}$$

$$TAO\_fl = KSET \times TSET\_fl - KR \times TR\_fr - KAM \times TAM - KS \times TS\_fl + C + KLR\_F2 \times (TSET\_fl - TSET\_fr) \quad \text{(formula 9)}$$

$$TAO\_rr = KSET \times TSET\_rr - KR \times TR\_rr - KAM \times TAM - KS \times TS\_rr + C + KLR\_R \times (TSET\_rr - TSET\_rl) + KFR\_S \times (TSET\_rr - TSET\_fr) + KFR\_C \times (TSET\_rr - TSET\_fl) \quad \text{(formula 10)}$$

$$TAO\_rl = KSET \times TSET\_rl - KR \times TR\_rr - KAM \times TAM - KS \times TS\_rl + C + KLR\_R2 \times (TSET\_rl - TSET\_rr) + KFR\_S \times (TSET\_rl - TSET\_fl) + KFR\_C \times (TSET\_rl - TSET\_fr) \quad \text{(formula 11)}$$

Here, when formulas 1 to 4 shown in the above first embodiment and formulas 8 to 11 are compared with each other, formulas 9 and 2 are different from each other and formulas 11 and 4 are different from each other.

The formula 9 will be first explained. Since the inside air temperature of the air conditioning zone 1b of the front seat left-hand side is not detected by the temperature sensor, the inside air temperature (TR_fl) of the air conditioning zone 1b of the front seat left-hand side is approximated by using the inside air temperature (TR_fr) of the air conditioning zone 1a of the front seat right-hand side and the difference (TSET_fl−TSET_fr) between the front seat left and right desirable temperatures. That is, when the inside air temperature (TR_fl) is approximately shown by TR_fl=TR_fr+α1×(TSET_fl−TSET_fr) and the formula 2 is calculated, the following formula is obtained.

$$TAO\_fl = KSET \times TSET\_fl - KR \times (TR\_fr + \alpha 1 \times (TSET\_fl - TSET\_fr)) - KAM \times TAM - KS \times TS\_fl + C + KLR\_F \times (TSET\_fl - TSET\_fr)$$

$$= KSET \times TSET\_fl - KR \times TR\_fr - KAM \times TAM - KS \times TS\_fl + C + (KLR\_F - KR \times \alpha 1) \times (TSET\_fl - TSET\_fr)$$

Here, when the coefficient (KLR_F−KRα1) of (TSET_fl−TSET-fr) is set to KLR_F2, the above formula 9 is formed.

Similarly, in the formula 10, the inside air temperature (TR_rl) of the air conditioning zone 1d of the rear seat left-hand side is approximated by the inside air temperature (TR_rr) of the air conditioning zone 1c of the rear seat right-hand side and the difference (TSET_rl−TSET_rr) between the rear seat left and right desirable temperatures.

Further, TR_rl=TR_rr+α2×(TSET_rl−TSET_rr) and KLR_R2=(KLR_R−KR×α2) are set.

Here, it is not necessary to constantly set α1 and α2 used to estimate the inside air temperatures of the air conditioning zones 1b, 1d having no inside air temperature sensor, but α1 and α2 may be changed by using at least one of the values of the inside air temperature sensor and the outside air temperature sensor. Further, it is not necessary to constantly set each coefficient and constant, but different values may be set in the coefficient and the constant in accordance with the seats and the environmental conditions.

Third Embodiment

In the above second embodiment, the inside air temperature every air conditioning zone is calculated by the estimation and the target blowing-out temperature is calculated every air conditioning zone by using this calculated inside air temperature. However, instead of this construction, a case where one inside air temperature sensor is used will be explained in this third embodiment.

For example, it is set that only the inside air temperature sensor 1a of the air conditioning zone 1a of the front seat right-hand seat side is arranged and no inside air temperature sensor is arranged in the air conditioning zones 1b to 1d. In this case, the air conditioning ECU 8 calculates the respective target blowing-out temperatures TAO_fr, TAO_fl, TAO_rr, TAO_rl of the air conditioning zones 1a, 1b, 1c, 1d on the basis of the following formulas 12 to 15 (estimating means).

$$TAO\_fr = KSET \times TSET\_fr - KR \times TR\_fr - KAM \times TAM - KS \times TS\_fr + C + KLR\_F \times (TSET\_fr - TSET\_fl) \quad \text{(formula 12)}$$

-continued $$TAO\_fl = KSET \times TSET\_fl - KR \times TR\_fr - \quad \text{(formula 13)}$$
$$KAM \times TAM - KS \times TS\_fl + C +$$
$$KLR\_F2 \times (TSET\_fl - TSET\_fr)$$

$$TAO\_rr = KSET \times TSET\_rr - KR \times TR\_rr - \quad \text{(formula 14)}$$
$$KAM \times TAM - KS \times TS\_rr + C +$$
$$KLR\_R \times (TSET\_rr - TSET\_rl) +$$
$$KFR\_S2 \times (TSET\_rr - TSET\_fr) +$$
$$KFR\_C \times (TSET\_rr - TSET\_fl)$$

$$TAO\_rl = KSET \times TSET\_rl - KR \times TR\_fr - \quad \text{(formula 15)}$$
$$KAM \times TAM - KS \times TS\_rl + C +$$
$$KLR\_R \times (TSET\_rl - TSET\_rr) +$$
$$KFR\_S \times (TSET\_rl - TSET\_fl) +$$
$$KFR\_C2 \times (TSET\_rl - TSET\_fr)$$

Here, since the inside air temperature sensor 84a is arranged in the air conditioning zone 1a of the front seat right-hand side, formulas 12 and 13 are the same formulas as formulas 8 and 9 shown in the above second embodiment. Formulas 14 and 15 are different from formulas 10 and 11 shown in the above second embodiment.

Here, the formula 14 will be explained. The inside air temperature (TR_rr) of the air conditioning zone 1c of the rear seat right-hand seat side is approximated by the inside air temperature (TR_fr) of the front seat right-hand side and the desirable temperature difference (TSET_rr–TSET_fr). That is, when TR_rr is approximately represented by TR_rr=TR_fr+β1×(TSET_rr–TSET_fr) and the formula 3 shown in the above first embodiment is calculated, the following formula is obtained.

$$TAO\_rr = KSET \times TSET\_rr - KR \times (TR\_fr + \beta 1 \times$$
$$(TSET\_rr - TSET\_fr)) - KAM \times TAM - KS \times$$
$$TS\_rr + C + KLR\_R \times (TSET\_rr - TSET\_rl) +$$
$$KFR\_S \times (TSET\_rr - TSET\_fr) + KFR\_C \times$$
$$(TSET\_rr - TSET\_fl)$$
$$= KSET \times TSET\_rr - KR \times TR\_fr - KAM \times TAM -$$
$$KS \times TS\_rr + C + KLR\_R \times (TSET\_rr - TSET\_rl) +$$
$$(KLR\_S - KR \times \beta 1) \times (TSET\_rr - TSET\_fr) +$$
$$KFR\_C \times (TSET\_rr - TSET\_fl)$$

Here, when the coefficient (KLR_R–KR×β1) of (TSET_rr–TSET_fr) is set to KLR_S2, the formula 14 is obtained as described above.

Similarly, in the formula 15, the inside air temperature (TR_rl) of the air conditioning zone 1d of the rear seat left-hand seat side is approximated by the inside air temperature (TR_fr) of the front seat right-hand side and the desirable temperature difference (TSET_rl–TSET_fr).

Further, TR_rl=TR_fr+β2×(TSET_rl–TSET_fr) and KFR_C2=(KLR_C–KR×β2) are set.

Here, it is not necessary to constantly set β1, β2 used to estimate the inside air temperature of the air conditioning zone having no inside air temperature sensor, but β1, β2 may be changed by using at least one of the values of the inside air temperature sensor and the outside air temperature sensor. Further, it is not necessary to constantly set each coefficient and constant, but different values may be set in the coefficient and the constant in accordance with the seats and the environmental conditions.

Other Embodiments

Although the present invention has been fully described in connection with the preferred embodiments thereof with reference to the accompanying drawings, it is to be noted that various changes and modifications will become apparent to those skilled in the art.

For example, the above-described second embodiment, it is explained that the inside air temperature sensors 84a, 85a are arranged in the air conditioning zones 1a, 1c, and no inside air temperature sensor is arranged in the air conditioning zones 1b, 1d, and the inside air temperatures of the air conditioning zones 1b, 1d are estimated as an example. However, instead of this construction, the vehicle air conditioner can be also constructed such that no inside air temperature sensor is arranged in the air conditioning zones 1a, 1c and the inside air temperature sensors 84b, 85b are arranged in the air conditioning zones 1b, 1d and the inside air temperatures of the air conditioning zones 1a, 1c are estimated.

In the above-described third embodiments, it is explained that only the inside air temperature sensor 84 a for detecting the inside air temperature of the air conditioning zone la among the air conditioning zones 1a, 1b, 1c, 1d is adopted, and the blowing-out target temperature every air conditioning zone is calculated by using the detected inside air temperature of this inside air temperature sensor 84a as an example. However, the present invention is not limited to this example, but the inside air temperature sensor for detecting the inside air temperature with respect to one of the air conditioning zones 1b, 1c, 1d may be adopted and the blowing-out target temperatures of the remaining air conditioning zones of the air conditioning zones 1a, 1b, 1c, 1d may be calculated by using the temperature detected by this adopted inside air temperature sensor.

Such changes and modifications are to be understood as being within the scope of the present invention as defined by the appended claims.

What is claimed is:

1. An air conditioner for a vehicle having first and second air conditioning zones positioned at right and left sides of a front seat in a vehicle compartment, and third and fourth air conditioning zones positioned at right and left sides of a rear seat in the vehicle compartment, the air conditioner comprising:

environmental condition determining means for determining environmental conditions of the first to fourth air conditioning zones by respectively detecting the environmental conditions or by estimating the environmental conditions from at least one of detected values;

setting means for setting each of desirable temperatures of the first to fourth air conditioning zones by a passenger in the vehicle compartment;

calculating means for calculating each of target blowing-out temperatures of air blown out to the first to fourth air conditioning zones in accordance with the environmental conditions determined by the environmental condition determining means and the desirable temperatures of the first to fourth air conditioning zones; and control means for respectively independently controlling temperatures of air blown out to the first to fourth air conditioning zones, to the target blowing-out temperatures, respectively, wherein
the calculating means corrects an influence from the other air conditioning zones by using a selected desirable temperature in the desirable temperatures of the first to fourth air conditioning zones, while calculating the individual target blowing-out temperatures of the first to fourth air conditioning zones.

2. The air conditioner according to claim 1, wherein:,
the calculating means respectively calculates the target blowing-out temperatures of the first and second air conditioning zones by using a temperature difference between the desirable temperature of the first air conditioning zone and the desirable temperature of the second air conditioning zone; and
the calculating means also respectively calculates the target blowing-out temperatures of the third and fourth air conditioning zones by using a temperature difference between the desirable temperature of the third air conditioning zone and the desirable temperature of the fourth air conditioning zone, and a temperature difference between the desirable temperature of one of the first and second air conditioning zones and the desirable temperature of one of the third and fourth air conditioning zones.

3. The air conditioner according to claim 2, wherein:
the environmental condition determining means includes a detecting means for detecting an air temperature of at least a predetermined air conditioning zone in the first to fourth air conditioning zones, and an estimating means for estimating air temperatures of the other air conditioning zones, except for the predetermined air conditioning zone; and
the calculating means calculates the target blowing-out temperatures of the first to fourth air conditioning zones in accordance with desirable temperatures of the first to fourth air conditioning zones, the air temperatures estimated by the estimating means and the air temperature detected by the detecting means.

4. The air conditioner according to claim 3, wherein the estimating means calculates a temperature difference between each desirable temperature of the other air conditioning zones and the desirable temperature of the predetermined air conditioning zone, and estimates each air temperature of the other air conditioning zones based on the calculated temperature difference and the air temperature of the predetermined air conditioning zone detected by the detecting means.

5. The air conditioner according to claim 2, wherein:
the calculating means corrects an influence due to a temperature difference between the desirable temperatures of the first and second air conditioning zones, when calculating the target blowing-out temperatures of the first and second air conditioning zones; and
the calculating means corrects an influence due to a temperature difference between the desirable temperatures of the third and fourth air conditioning zones and an influence due to a temperature difference between each desirable temperature of the third and fourth air conditioning zones and each desirable temperature of the first and second air conditioning zones, when calculating the target blowing-out temperatures of the third and fourth air conditioning zones.

6. The air conditioner according to claim 2, wherein:
the calculating means includes a first calculation portion for calculating the target blowing-out temperature of the first air conditioning zone, a second calculation portion for calculating the target blowing-out temperature of the second air conditioning zone, a third calculation portion for calculating the target blowing-out temperature of the third air conditioning zone, and a fourth calculation portion for calculating the target blowing-out temperature of the fourth air conditioning zone;
the first calculation portion calculates the target blowing-out temperature of the first air conditioning zone by using at least the desirable temperature of the first air conditioning zone and a correction portion that is a difference between the desirable temperature of the second air conditioning zone and the desirable temperature of the first air conditioning zone;
the second calculation portion calculates the target blowing-out temperature of the second air conditioning zone by using at least the desirable temperature of the second air conditioning zone and a correction portion that is a difference between the desirable temperature of the first air conditioning zone and the desirable temperature of the second air conditioning zone;
the third calculation portion calculates the target blowing-out temperature of the third air conditioning zone by using the desirable temperature of the third air conditioning zone, a correction portion that is a difference between the desirable temperature of the first air conditioning zone and the desirable temperature of the third air conditioning zone, and a correction portion that is a difference between the desirable temperature of the second air conditioning zone and the desirable temperature of the third air conditioning zone; and
the fourth calculation portion calculates the target blowing-out temperature of the fourth air conditioning zone by using the desirable temperature of the fourth air conditioning zone, a correction portion that is a difference between the desirable temperature of the first air conditioning zone and the desirable temperature of the fourth air conditioning zone, and a correction portion that is a difference between the desirable temperature of the second air conditioning zone and the desirable temperature of the fourth air conditioning zone.

7. The air conditioner according to claim 1, wherein:
the environmental condition determining means includes first to fourth inside air temperature sensors for detecting inside air temperatures of the vehicle compartment, respectively, corresponding to the first to fourth air conditioning zones; and
the calculating means calculates the target blowing-out air temperature of each air conditioning zone by using inside air temperatures detected by the first to fourth inside air temperature sensors.

8. The air conditioner according to claim 1, wherein:
the environmental condition determining means includes a first inside air temperature sensor for detecting an inside air temperature of one of the first and second air conditioning zones, and a second inside air temperature sensor for detecting an inside air temperature of one of the third and fourth air conditioning zones;
the environmental condition determining means approximates an inside air temperature of the other one of the first and second air conditioning zones based on the inside air temperature detected by the first inside air temperature sensor and a temperature difference between the desirable temperatures of the first and second air conditioning zones; and
the environmental condition determining means approximates an inside air temperature of the other one of the third and fourth air conditioning zones based on the inside air temperature detected by the second inside air temperature sensor and a temperature difference between the desirable temperatures of the third and fourth air conditioning zones.

9. The air conditioner according to claim 1, wherein:

the environmental condition determining means includes an inside air temperature sensor for detecting an inside air temperature of one of the first and second air conditioning zones in the vehicle compartment;

the environmental condition determining means approximates an inside air temperature of one of the third and fourth air conditioning zones based on the inside air temperature detected by the inside air temperature sensor and a temperature difference between the desirable temperatures of the one of the first and second air conditioning zones and the one of the third and fourth air conditioning zones; and the environmental condition determining means approximates an inside air temperature of the other one of the third and fourth air conditioning zones based on the inside air temperature detected by the inside air temperature sensor and a temperature difference between the desirable temperatures of the one of the first and second air conditioning zones and the other one of the third and fourth air conditioning zones.

* * * * *